Nov. 13, 1951 W. VAN DER SLUYS 2,574,804
RAILWAY TRUCK
Filed Oct. 19, 1946 3 Sheets-Sheet 1
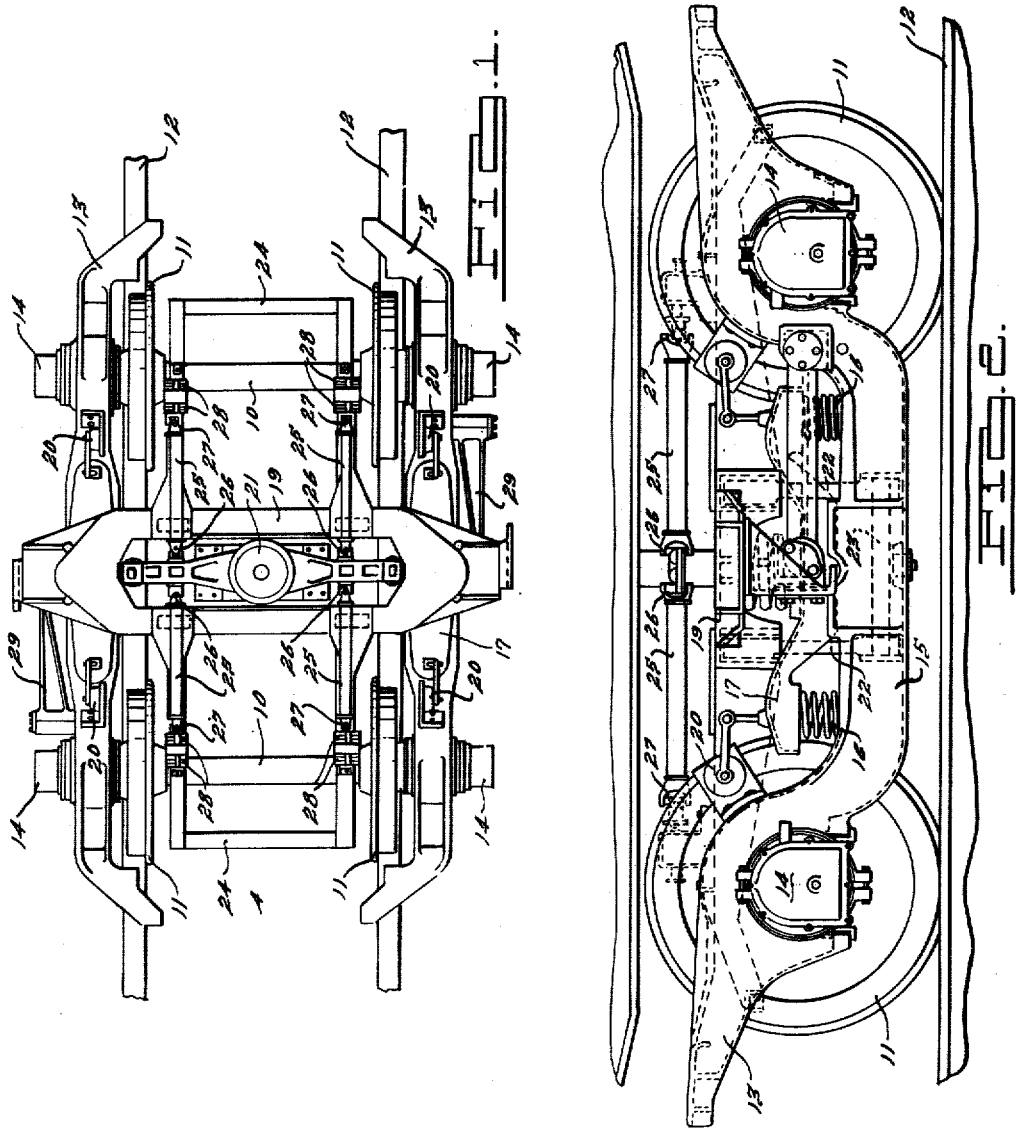
INVENTOR.
William Van Der Sluys.
BY
Harness + Harris
ATTORNEYS.

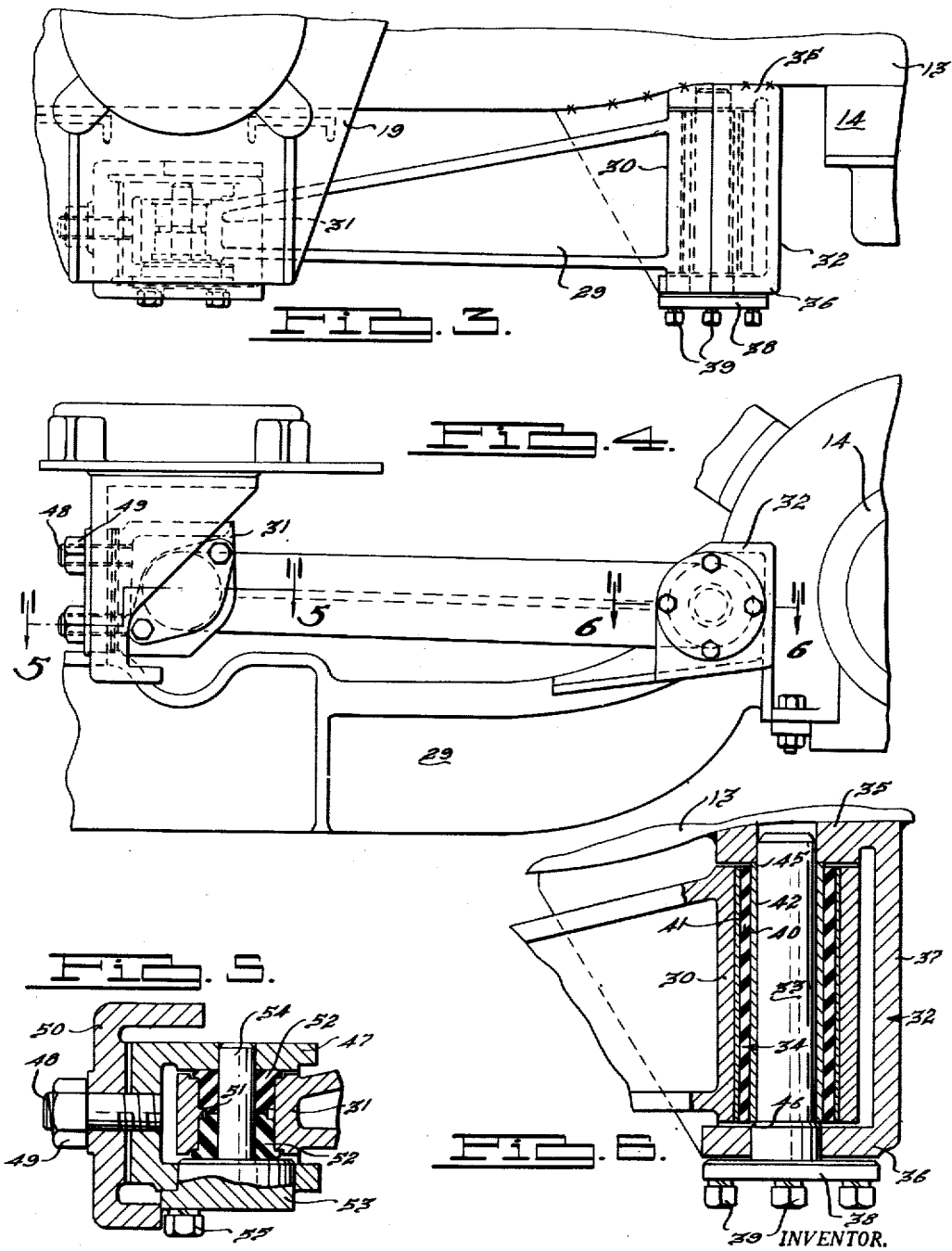

Nov. 13, 1951 W. VAN DER SLUYS 2,574,804
RAILWAY TRUCK
Filed Oct. 19, 1946 3 Sheets-Sheet 3
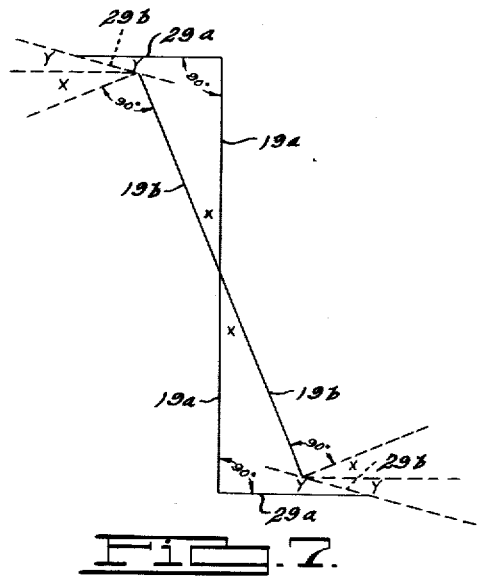
Fig. 7.
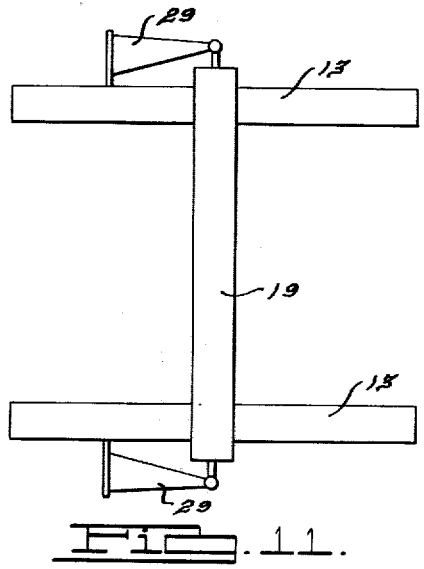
Fig. 11.
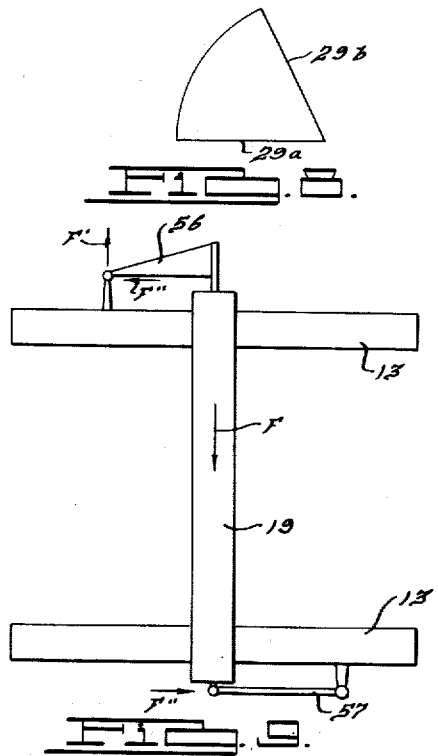
Fig. 8.
Fig. 9.
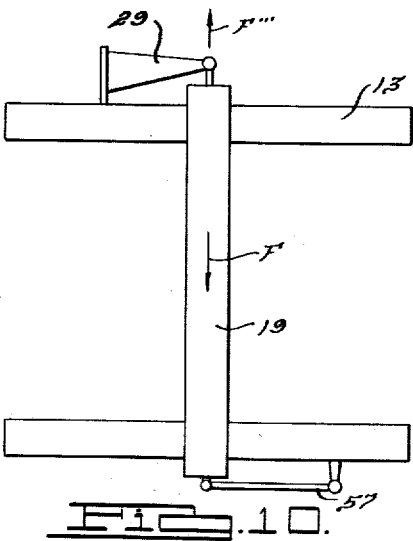
Fig. 10.
INVENTOR.
William Van Der Sluys
BY
Harness & Harris
ATTORNEYS.

Patented Nov. 13, 1951

2,574,804

UNITED STATES PATENT OFFICE 2,574,804

RAILWAY TRUCK

William Van Der Sluys, Detroit, Mich., assignor to Chrysler Corporation, Highland Park, Mich., a corporation of Delaware Application October 19, 1946, Serial No. 704,432

14 Claims. (Cl. 105—197)

This application relates to the use of links for interconnecting parts of a railway truck adapted for relative movement. More specifically it relates to the use of links of a special type that are adapted to prevent substantial relative longitudinal and lateral movement between truck parts while permitting relative vertical movement therebetween and involves an improvement over the construction disclosed and claimed in the copending Van Der Sluys application Serial No. 497,281, filed August 4, 1943 now Patent 2,498,745 dated February 28, 1950.

In that application there is disclosed and claimed the use of a special link wide at one end and narrow at the other end for connecting parts of a railway truck so as to prevent substantial relative movement of the parts in the direction of the length of the link and also in a direction transverse to the length of the link or in the direction of extension of the wide portion while permitting relative vertical movement of the truck parts by virtue of the relatively free pivotal connections of both ends of the link with the associated truck parts. In the copending Van Der Sluys application the narrow end of the link is shown to be connected to an equalizer or side frame, and the wide end to the load-carrying frame such as a transom frame.

I have discovered that by reversing this arrangement, i. e., by connecting the wide end of the link to the equalizer or side frame and the narrow end of the load-carrying frame, I have obtained less tendency toward unsquaring of the truck upon application of transverse forces to the load-carrying frame and upon vertical movement of the load-carrying frame with respect to the equalizer or side frame.

An object of the present invention is to provide an improved arrangement for connecting relatively movable parts of a railway truck by means of a link that is wide at one end and narrow at the other end, said link restraining relative movement between the parts connected by the link not only in the direction of the length of the link but also in a direction transverse to the length of the link by virtue of the wide portion at one end of the link.

Other objects will appear from the disclosure.

Fig. 1 is a plan view of a railway truck embodying the construction of the present invention;

Fig. 2 is a side view of the railroad truck;

Fig. 3 is an enlarged plan view showing the novel mode of connecting parts of a railroad truck by a link;

Fig. 4 is a side view of the parts shown in Fig. 3;

Fig. 5 is a sectional view taken on the line 5—5 of Fig. 4;

Fig. 6 is a sectional view taken on the line 6—6 of Fig. 4;

Figs. 7 and 8 are diagrammatic views indicating the relative position of truck parts upon vertical movement of the transom frame;

Figs. 9 and 10 are diagrammatic views showing the forces applied to truck parts upon the application of a transverse force to the transom frame; and Fig. 11 shows diagrammatically a modified form of truck according to the present invention.

As shown in Figs. 1 and 2 spaced axles 10 are supported on wheels 11, which run upon rails 12. Side frames or equalizers 13 are mounted upon the axles 10 outside of the wheels 11 by means of journal boxes 14. These journal boxes are disclosed and claimed in detail in Janeway and Miers Patent No. 2,335,120 dated November 23, 1943 and are adapted to permit a limited amount of relative vertical movement of one equalizer and the associated wheels and axle ends with respect to the other equalizer and the associated wheels and axle ends and to prevent relative longitudinal movement and relative transverse movement between these parts. These bearing boxes are relied upon to resist unsquaring of the truck. The bearing boxes 14 are received in yokes formed at the ends of the equalizers 13. Each equalizer has a drop center portion 15 on which is mounted a pair of longitudinally spaced coil springs 16 which carry the ends of an intermediate beam 17. The intermediate beam carries at a mid point a coil spring 18 upon which is mounted one end of a transom frame 19. Thus one end of the transom frame is resiliently supported by the springs 16 and 18 and the intermediate beam 17 on one equalizer 13 and the other end is similarly supported upon the other equalizer 13. The springs 16 are damped by a pair of shock absorbers 20 connected to the ends of the intermediate beam 17 and to the equalizer 13 adjacent the journal boxes 14. A truck bolster 21 is resiliently carried on the transom frame 19 through swing hangers 22 and a plank 23. The transom frame 19 has extensions 24 serving for the support of brake gear, not shown. Bolster 21 is stabilized longitudinally with respect to the transom frame 19 by means of four longitudinal links 25, the links 25 being connected to the bolster through universal joints 26 and being connected to the transom extensions 24 through universal joints 27 and resilient pads 28.

Each end of the transom frame 19 is connected to an adjacent equalizer by means of a substantially triangular shaped link 29 which is best seen in Figs. 3 to 6 inclusive. This link has a wide portion 30 at one end and a narrow portion 31 at the other, the intermediate part of the link being tapered to connect the narrow and wide portions. The wide portion 30 of the link is pivotally connected to the equalizer 13 by means of a bracket 32, a pin 33 mounted therein, and a resilient sleeve unit 34. The bracket 32 has an end 35 appropriately secured to the equalizer 13 adjacent the journal box 14 by metallic bonding such as welding, and has an opposed end 36 spaced from the end 35 by a connecting portion 37. The bases 35 and 36 have openings which receive the pin 33, which is secured against rotation with respect to the bracket 32 by an enlarged base 38 at one end of the pin and screws 39 connecting the enlarged base 38 and the bracket end 36. The resilient unit 34 fits in the space between the pin 33 and an opening in the wide end 30 of the link 29. This resilient unit comprises a flexible sleeve 40 formed of a suitable material such as rubber, an external metallic sleeve 41 and an internal metallic sleeve 42. The rubber sleeve 40 is compressed between the metallic sleeves 41 and 42, these sleeves being assembled by a process involving stretching of the rubber sleeve 40 and the application of the metallic sleeves 41 and 42 over the rubber sleeve 40. The flexible unit 34 is press fitted in the long opening in the wide end 30 of the link 29, and thus the outer sleeve 41 is held against movement with respect to the link. The inner metallic sleeve 42 projects beyond the sleeves 40 and 41 of the unit 34 as indicated at 45 and is held in endwise engagement with the end 35 of the bracket 32 by a shoulder 46 on the pin 33. Thus rotational movement between pin 33 and the inner sleeve 42 of the resilient unit 34 is prevented. Rotational movement of the link 29 with respect to the pin 33 cannot take place except through shear action of the rubber sleeve 40, i. e., twisting of the sleeve. The small end 31 of the link 29 fits between ends of a bracket 47, which is attached by means of screws 48 and nuts 49 to a bracket 50 appropriately secured to the under side of the end of the transom frame 19 by metallic bonding such as welding. The small end 31 of the link 29 has an opening at the mid portion of which is located a shoulder 51. Complementary resilient bushings 52 formed of an appropriate material such as rubber, fit in the opening against the shoulder 51. The bushings 52 project outwardly of the sides of the small end 31 of the link 29. The one bushing 52 is engaged by one end of the bracket 47, and the other bushing 52 is engaged by an enlarged base portion 53 formed on a pin 54 which extends through the bushings 52 and into an opening in the base 47. Screws 55 secure the base 53 to the bracket 47. The proportions of the parts just described are such that the bushings 52 are compressed and thereby grip the opening in the narrow end 31 of the link 29 and the pin 54 so as to prevent rotational movement between these parts except through shear action or twisting of the bushings 52. It will be seen from Fig. 1 that there is a link 29 between each equalizer 13 and the adjacent end of the transom frame 19, and that the one link 19 extends in one direction from the transom frame to the one equalizer and the other link extends in the opposite direction from the transom frame to the other equalizer. It is to be noted that the wide end 30 of each link 29 is connected to an equalizer 13, and that the narrow end 31 is connected to the adjacent end of the transom frame 19. This arrangement is important, for it marks the departure from the aforementioned copending Van Der Sluys application and is of considerable advantage.

The transom frame 19 is connected to the equalizers 13 only by the resilient supporting means comprising springs 16 and 18 and intermediate beams 17 and by the links 29. The transom frame 19 is free of connection with the axles 10 and the journal boxes 14 except through the equalizers 13. The links 29 are adapted to prevent substantial relative longitudinal movement between the transom frame 19 and the equalizers 13, because the links 29 extend longitudinally of the truck. The wide end portions 30 of the links 29, by extending transversely of the truck, are adapted to prevent substantial relative transverse movement between the transom frame and the equalizers. A slight amount of relative longitudinal and transverse movements between the transom frame and the equalizers may take place through compression of the resilient sleeves 40 and the resilient bushings 52. Relative vertical movement of the transom frame 19 with respect to the equalizers 13 takes place through pivoting of the ends of the links 29 with respect to the brackets to which the links are connected, through shear action or twisting of the resilient sleeve 40 and the resilient bushings 52.

Attention is now directed to Figs. 7 and 8, which show diagrammatically the relative positions of the transom frame 19 and the links 29 with change in vertical position of the transom frame. Fig. 7 is a plan view, and Fig. 8 is an end view. When the transom frame is in its mean vertical position, it occupies the position designated by the line 19$^a$, extending transversely across the truck and being at right angles to the links 29 designated by lines 29$^a$. Now assume that the transom frame rises sufficiently to bring the links 29 to the position indicated by the line 29$^b$ in Fig. 8. This will rotate the transom frame to the position designated by the line 19$b$ in Fig. 7. It will be seen that in the new position the angular position of each link 29 with respect to the transom frame 19 will have changed from 90° to an angle greater than 90° by the angle indicated as $X+Y$. X is the change in angle of the transom frame from 19$^a$ to 19$^b$, and Y is the change in the angular position of each link 29 with respect to the equalizer 13 to which it is connected. The angle of the link 29 relative to the transom frame 19 is increased by an amount equal to $X+Y$, whereas the angle of the link 29 with respect to the equalizer is increased only by an amount equal to Y. Because of this small angular change at the equalizer end of the link 29, it will be shown to be advantageous to have the wide end 30 and its associated long resilient unit 34 at the equalizer rather than at the transom frame as in the aforementioned copending Van Der Sluys application.

In actual operation of the railway truck the transom frame will, of course, not move up far enough to bring the links 29 to the position represented by the line 29$^b$. This extreme position is used only to make the angles X and Y large enough for suitable showing. In actual operation the vertical movement of the transom frame of only two inches is contemplated with a link 29 of a length of 28 inches. Thus in Fig. 8 the link 29 would move through a small angle away from the horizontal position represented by the line 29ᵃ, and the angle X, through which the transom frame 19 moves would also be small, but the angle Y would be very, very small. These angles, particularly the angle Y, would be difficult of representation on the scale shown. In any event, it is to be noted that for small angular changes of the link 29 such as would be involved in the aforementioned two inches of vertical movement of the transom 19 the ratio of the angle $X+Y$ to the angle Y would be many times greater. Thus for a given vertical shifting of the transom frame 19 from its mean position practically no compression of the resilient sleeve 40 will be required with the wide end 30 of the link connected to the equalizer 13, whereas considerable compression will be required if the wide end of the link 29 is connected to the transom.

With the reversal of the link 29 as aforesaid, the narrow end 31 of the link is now connected to the transom frame, and this means that there will be a change in angle at this end equal to $X+Y$. However, since the end is narrow, there will be much less resistance to such angular movement in the narrow end than in the wide end, and as a matter of fact, the connection of the narrow end of the link 28 with the transom frame 19 may be considered almost a simple pivotal joint insofar as relative horizontal angular movement between link and transom frame is concerned. With the wide end of the link 29 on the transom frame as in the copending Van Der Sluys application, there would be considerable resistance to horizontal angular movement between link and transom frame, and consequently the tendency toward the development of forces that would produce unsquaring of the truck on vertical movement of the transom frame might be quite appreciable. With the wide end of the link connected to the equalizer in accordance with the present invention, angular movement between the small end of the link and the transom is easy, and so there is practically no tendency for the development of horizontally extending, longitudinally directed, forces that would cause the equalizers to move longitudinally with respect to each other.

The arrangement of the present application involving connection of the wide end of the link with the equalizer also has an advantage over the arrangement of the copending Van Der Sluys application involving connection of the wide end of the link to the transom frame, insofar as the application of transverse forces to the transom frame is concerned.

Consider for the moment Fig. 9 which shows diagrammatically spaced equalizers 13 and a transom frame 19 extending between them. One end of the transom frame 19 is shown to be connected to one equalizer 13 by a link 56 having a wide end connected to the transom frame and a narrow end connected to the equalizer. The other end of the transom frame is shown to be connected to the other end of the equalizer 13 by a simple longitudinal link 57, which is representative of a wide end link 56 in which the rubber connections are softer and thus have less resistance to twisting movements. Assume that a transverse force F, which may, for example, be due to centrifugal action of the car body on a curved track is applied to the transom frame 19 as indicated. The connection of the narrow end of the link 56 with the one equalizer 13 provides practically no resistance to horizontal rotation of the link with respect to the equalizer. Since the narrow end of the link 56 is connected to the equalizer 13 the transverse force F will be resisted by a transverse force F' at the connection of the narrow end of the link 56 with the equalizer 13. The forces F and F' develop a couple and constitute a moment tending to rotate the transom clockwise, which movement can only be balanced by forces F'' acting longitudinally of the links at their connections to the equalizers 13. The amount of these forces will be dependent upon the degree of unbalance in hardness of the rubber connections in the two links 56 and 57. The longitudinal forces F'' resulting from transverse force F thus tend to produce an unsquaring effect upon the truck.

Now consider the truck of Fig. 10 comprising the equalizers 13 and the transom frame 19 and also the link 29 connected in the manner of the present application, i. e., the wide end to the equalizer 13 and the narrow end to the transom frame 19. The simple longitudinal link 57 is shown as connected to the other equalizer 13 and the other end of the transom frame 19, to represent a wide end link like the link 29 having rubber connections that are softer and thus less resistant to angular movement. This unbalance between the links is adequately handled when the wide end of the link 29 is connected to the equalizer 13 as shown in Fig. 10. Here a force F acting upon the transom 19 because of centrifugal action of the car body upon a curved track is resisted by the force F''' and is transmitted by the link 29 to the equalizer 13 as a force acting at the center of the equalizer 13 opposite the connection of the link 29 to the transom frame 19. Since the force F is resisted by a force F''' which is in line with F, there are no couples or moments acting on the transom due to force F, and there can be no resulting longitudinal forces tending to produce unsquaring of the truck.

Fig. 11 shows a modified form of truck according to the present invention in which the two links 29 used to connect the ends of the transom frame 19 to the equalizers 13 extend in the same direction from the transom frame to the equalizers. Here again the wide ends of the links are connected to the equalizers, and the narrow ends, to the transverse frame. In this modification there is no angular shifting of the transom frame 19 upon vertical movement of the transom frame with respect to the equalizers, and consequently there is no horizontal angular movement of the links 29 with respect to the equalizers and the transom frame. It is obvious that, if as in the copending Van Der Sluys application the narrow ends of the links were attached to the equalizers and the links extended in the same direction from the transom frame, a transverse force on the transom frame due to centrifugal action would produce couples involving longitudinal forces tending to produce unsquaring of the truck, regardless of whether the rubber sleeves in the wide ends of the links were equal in hardness. With the wide ends of the links 29 connected to the equalizers 13 as shown in Fig. 11, the transverse force imposed on the transom frame 19 is resisted by an opposing force acting in line with the transverse forces, as shown for the arrangement of Fig. 10. Consequently, there will be no longitudinal forces tending to produce unsquaring of the truck.

I claim:

1. In a railway truck, wheels and axles, journal boxes for said axles, equalizing members on opposite sides of the truck supported by said boxes and having end portions adapted to receive said boxes whereby each equalizing member and the corresponding boxes move as a unit in the truck, a truck frame member spring supported on said equalizing members and free of direct engagement with said equalizing members and free of association with the journal boxes except through said equalizing members, and a normally horizontally disposed anchor connected to and extending between an equalizing member on one side of the truck and said frame member, the connections between the anchor and the equalizing member and the frame member permitting pivotal movement of the anchor about transversely directed horizontally extending axes and including resilient means to cushion forces transmitted between the equalizing member and the truck frame, said anchor having at one end a wide portion for connection to said equalizing member and at the other end a narrow portion for connection to said truck frame member, whereby the equalizing member to which the anchor is connected is held against substantial movement relative to said frame member longitudinally and transversely of the truck while accommodating relative vertical movement between them.

2. In a railway truck, spaced axles, wheels on each axle, equalizing members connecting the axles at opposite sides of the truck, a truck frame member spring-supported on the equalizing members and free of direct engagement with said equalizing members, and a pair of longitudinally extending, normally horizontally disposed anchors, one anchor extending in one direction from the truck frame member along one equalizing member at one side of the truck and being connected to the truck frame member and to said one equalizing member, the other anchor extending in the opposite direction from the truck frame member along the other equalizing member at the other side of the truck and being connected to the truck frame member and to the said other equalizing member, the connections between the anchors and the equalizing members and the truck frame member including resilient means arranged for rotation about transversely extending, horizontally disposed axes and adapted to cushion forces transmitted between the equalizing members and the truck frame, each anchor having at one end a wide portion for connection to the associated equalizing member and at the other end a narrow portion for connection to the truck frame member, whereby each equalizing member is held against substantial movement relative to said truck frame member longitudinally and transversely of the truck while being permitted vertical movement with respect to the truck frame member.

3. In a railway truck, a side frame member, a truck frame member, spring means supporting the truck frame member on the side frame member, a link extending longitudinally along the side frame member and having a wide portion at one end and a narrow portion at the other end, means pivotally connecting the wide portion of the link to the side frame member about an axis extending transversely of the side frame member, said means including resilient means extending the width of the wide portion, and resilient means pivotally connecting the narrow portion of the link to the truck frame member about an axis extending transversely of the side frame member, whereby the side frame member and truck frame member are held against substantial relative movement transversely and longitudinally and yet are permitted relative vertical movement.

4. In a railway truck, a side frame member, a truck frame member, spring means supporting the truck frame member on the side frame member, a link extending longitudinally of the truck along the side frame and having at one end a relatively long transverse opening and at the other end a relatively short transverse opening, means connecting the said one end of the link to the side frame and including a relatively long horizontal pin secured to the side frame and passing through the long opening in the link, and a relatively long resilient sleeve tightly fitting between the long pin and the long opening, and means connecting the said other end of the link and the truck frame and including a relatively short horizontal pin secured to the truck frame and extending through the short opening in the link and a relatively short resilient sleeve tightly fitting between the short pin and the short opening, whereby the resilient sleeves by twisting about horizontally disposed, transversely extending axes accommodate relative vertical movement between the truck frame and the side frame, the link in cooperation with the resilient sleeves and the mountings therefore prevent substantial relative longitudinal movement between the truck frame and side frame, and the long opening, long pin, and relatively long resilient sleeve and mounting therefore prevent substantial relative transverse movement between the truck frame and the side frame, the connections between the link, side frame and truck frame permitting relative vertical movement between the side frame and truck frame.

5. In a railway truck, spaced side frames, a load-carrying frame spring-supported on the side frames, a pair of horizontal links, one extending longitudinally of the truck along one side frame in one direction from the load-carrying frame, the other extending longitudinally of the truck along the other side frame in the other direction from the load-carrying frame, each link having at one end a relatively long transverse opening and at the other a relatively short transverse opening, means pivotally connecting the said one end of the said one link to the said one side frame and including a relatively long horizontal pin secured to the said one side frame and positioned in the long opening and a relatively long resilient sleeve fitting tightly between the long opening and the long pin, means pivotally connecting the said one end of the said other link to the said other side frame in similar fashion, means pivotally connecting the said other end of the said one link to the load-carrying frame and including a relatively short horizontal pin secured to the load-carrying frame and positioned in the short opening and a relatively short resilient sleeve fitting tightly between the short opening and the short pin, and means pivotally connecting the said other end of the said other link to the load-carrying frame in similar fashion.

6. In a railway truck, longitudinally spaced axles, wheels on each axle, transversely spaced, longitudinally extending equalizing members connecting the axles at opposite sides of the truck, a truck frame member extending between and spring-supported on the equalizing members and free of direct engagement with said equalizing members, and a pair of normally horizontally disposed anchors extending along the equalizing members in the same direction from the truck frame member, one anchor being connected to the truck frame member and to one equalizing member, the other anchor being connected to the truck frame member and to the other equalizing member, the connections between the anchors and the equalizing members and the truck frame member permitting relative pivotal movement between the anchors and connected members about horizontally disposed transversely extending axes and including resilient means to cushion forces transmitted between the equalizing members and the truck frame, each anchor having at one end a wide portion for connection to the associated equalizing member and at the other end a narrow portion for connection to the truck frame member, whereby each equalizing member is held against substantial movement relative to said truck frame member longitudinally and transversely of the truck while being permitted vertical movement with respect to the truck frame member.

7. In a railway truck, a wheel-connected structure, a load-carrying frame resiliently supported on the structure, and a longitudinally extending, horizontally disposed link having a wide end resiliently connected to the structure and a narrow end resiliently connected to the frame by pivot means permitting swinging of the link in a vertical plane, said link holding the structure and frame against substantial relative horizontal movement with respect to one another transversely and longitudinally of the truck while accommodating relative vertical movement between the structure and frame.

8. In a railway truck, a wheel-connected structure, a load-carrying frame movably supported on the structure, and a pair of longitudinally extending, horizontally disposed, links spaced from one another along the frame and extending in opposite directions from the frame, each link having a wide end and a narrow end, means resiliently connecting the narrow ends of the links to the frame, means resiliently connecting the wide ends of the links to the wheel-connected structure the resilient connections of the link ends to the frame and structure permitting swinging movement of the links in vertical planes about transversely directed, horizontally extending axes while preventing substantial relative movement in the direction of their lengths between the structure and the frame, the wide ends of the links preventing substantial relative movement between the structure and the frame transversely to the direction of the lengths of the links, and the narrow ends of the links offering substantially no resistance to angular movement of the links with respect to the frame arising from angular movement of the frame caused by vertical movement of the frame with respect to the structure, and the extension of the links in opposite directions from the frame, causing substantially no tendency toward unsquaring of the structure when transversely directed forces are applied to the frame.

9. In a railway truck, a wheel-connected structure, a load-carrying frame movably supported on the structure for vertical and transverse movement relative thereto, and a pair of longitudinally extending links spaced from one another along the frame, each link having a wide end and a narrow end, pivot means resiliently connecting the narrow ends of the links to the frame, pivot means resiliently connecting the wide ends of the links to the wheel-connected structure, whereby the links prevent substantial relative movement in the direction of their lengths between the structure and the frame, and the wide ends of the links prevent substantial relative movement between the structure and the frame transversely to the direction of the lengths of the links, the pivot means at the link ends permitting swinging of the links in vertically extending longitudinally disposed planes.

10. In a railway truck, a wheel-connected structure, a load-carrying frame movably supported on the structure, and a pair of longitudinally extending, horizontally disposed links spaced from one another along the frame extending in the same direction from the frame, each link having a wide end and a narrow end, horizontally extending, transversely directed pivot means resiliently connecting the narrow ends of the links to the frame, means resiliently connecting the wide ends of the links to the wheel-connected structure, whereby the links permit relative vertical movement of the frame and structure and prevent substantial relative movement in the direction of their lengths between the structure and the frame, the wide ends of the links preventing substantial relative movement between the structure and the frame transversely to the direction of the lengths of the links, and the connections of the wide ends of the links to the structure preventing a force on the frame transverse to the lengths of the links from setting up forces in the structure tending to produce unsquaring thereof.

11. In a railway truck, transversely spaced side frames, a load-carrying frame extending between and spring-supported on the side frames, a pair of horizontal links extending longitudinally of the truck along the side frames in the same direction from the load-carrying frame, each link having at one end a relatively long transverse opening and at the other a relatively short transverse opening, means connecting the said one end of the said one link to the said one side frame and including a relatively long horizontal pin secured to the said one end frame and positioned in the long opening and a relatively long resilient sleeve fitting tightly between the long opening and the long pin, means connecting the said one end of the said other link to the said other side frame in similar fashion, means connecting the said other end of the said one link to the load-carrying frame and including a relatively short horizontal pin secured to the load-carrying frame and positioned in the short opening and a relatively short resilient sleeve fitting tightly between the short opening and the short pin, and means connecting the said other end of the said other link to the load-carrying frame in similar fashion, the pin connections of the links to the frames permitting swinging movement of the links in vertically disposed longitudinally extending planes.

12. In a railway truck, longitudinally spaced axles, wheels on the ends of each axle, a pair of transversely spaced, longitudinally extending equalizing members connecting the axles at opposite sides of the truck, a truck frame member extending between and spring-supported on the centrally disposed portions of the equalizing members and free of direct engagement with said equalizing members, and a pair of normally horizontally disposed anchors, one anchor extending in one direction from the truck frame member along one equalizing member at one side of the truck and being connected to a centrally disposed portion of the truck frame member and to an end portion of the said one equalizing member, the other anchor extending in the opposite direction from the truck frame member along the other equalizing member at the other side of the truck and being connected to a centrally disposed portion of the truck frame member and to an end portion of the said other equalizing member, the connections between the anchors and the equalizing members and the truck frame member permitting swinging movement of the anchors in vertically extending, longitudinally disposed planes and including resilient means to cushion forces transmitted between the equalizing members and the truck frame, each anchor having at one end a wide portion for connection to the associated equalizing member and a substantially narrow portion for connection to the truck frame member whereby each equalizing member is held against substantial movement relative to said truck frame member longitudinally and transversely of the truck while being permitted vertical movement with respect to the truck frame member, the narrow portions of the anchors permitting relatively free angular movement of the anchors relative to the truck frame member about vertically extending axes.

13. In a railway truck, longitudinally spaced axles, wheels on the ends of each axle, a pair of transversely spaced, longitudinally extending equalizing members connecting the axles at opposite sides of the truck, a truck frame member extending between and spring-supported on the centrally disposed portions of the equalizing members and free of direct engagement with said equalizing members, and a pair of normally horizontally disposed anchors, one anchor extending from the truck frame member along one equalizing member at one side of the truck and being connected to a centrally disposed portion of the truck frame member and to an end portion of the said one equalizing member, the other anchor extending from the truck frame member along the other equalizing member at the other side of the truck and being connected to a centrally disposed portion of the truck frame member and to an end portion of the said other equalizing member, the connections between the anchors and the equalizing members and the truck frame member permitting swinging movement of the anchors in vertically extending, longitudinally disposed planes and including resilient means to cushion forces transmitted between the equalizing members and the truck frame, each anchor having at one end a wide portion for connection to the associated equalizing member and a substantially narrow portion for connection to the truck frame member whereby each equalizing member is held against substantial movement relative to said truck frame member longitudinally and transversely of the truck while being permitted vertical movement with respect to the truck frame member, the narrow portions of the anchors permitting relatively free angular movement of the anchors relative to the truck frame member about vertically extending axes.

14. In a railway truck, longitudinally spaced axles, wheels on the ends of each axle, a pair of transversely spaced, longitudinally extending equalizing members connecting the axles at opposite sides of the truck, a truck frame member extending between and spring-supported on the centrally disposed portions of the equalizing members and free of direct engagement with said equalizing members, and a pair of normally horizontally disposed anchors, one anchor extending from the truck frame member along one equalizing member at one side of the truck and being connected to a centrally disposed portion of the truck frame member and to an end portion of the said one equalizing member, the other anchor extending from the truck frame member along the other equalizing member at the other side of the truck and being connected to a centrally disposed portion of the truck frame member and to an end portion of the said other equalizing member, the connections between the anchors and the equalizing members and the truck frame member including a horizontally disposed, transversely extending pivot pin surrounded by resilient means to cushion forces transmitted between the equalizing members and the truck frame, each anchor having at one end a wide pivot pin encircling portion for connection to the associated equalizing member and a substantially narrow pivot pin encircling portion for connection to the truck frame member whereby each equalizing member is held against substantial movement relative to said truck frame member longitudinally and transversely of the truck while being permitted vertical movement with respect to the truck frame member, the narrow portions of the anchors permitting relatively free angular movement of the anchors relative to the truck frame member about vertically extending axes.

WILLIAM VAN DER SLUYS.

REFERENCES CITED

The following references are of record in the file of this patent:

UNITED STATES PATENTS

| Number | Name | Date |
|---|---|---|
| 2,323,348 | Nystrom et al. | July 6, 1943 |
| 2,355,104 | Pflager | Aug. 8, 1944 |
| 2,498,745 | Van Der Sluys | Feb. 28, 1950 |

Certificate of Correction

Patent No. 2,574,804 November 13, 1951

WILLIAM VAN DER SLUYS

It is hereby certified that error appears in the printed specification of the above numbered patent requiring correction as follows:

Column 10, line 13, before "means" insert *horizontally extending, transversely directed pivot*;

and that the said Letters Patent should be read as corrected above, so that the same may conform to the record of the case in the Patent Office.

Signed and sealed this 12th day of February, A. D. 1952.

[SEAL]

THOMAS F. MURPHY,
*Assistant Commissioner of Patents.*